United States Patent [19]

Fetzer et al.

[11] Patent Number: 4,899,041

[45] Date of Patent: Feb. 6, 1990

[54] LIGHT SENSOR FOR DETECTING AN OBJECT IN A CERTAIN DISTANCE

[75] Inventors: Günter Fetzer, Gundelfingen; Thomas Meinert, Emmendingen, both of Fed. Rep. of Germany

[73] Assignee: Erwin Sick GmbH Optik-Elektronik, Waldkirch, Fed. Rep. of Germany

[21] Appl. No.: 239,732

[22] Filed: Sep. 2, 1988

[30] Foreign Application Priority Data

Sep. 2, 1987 [DE] Fed. Rep. of Germany ....... 3729334

[51] Int. Cl.$^4$ .............................................. G01C 3/08
[52] U.S. Cl. .................................. 250/222.1; 250/204; 356/1; 356/4; 354/403
[58] Field of Search ............ 250/201, 204, 221, 222.1; 354/403; 356/1, 4

[56] References Cited

U.S. PATENT DOCUMENTS

| | | | |
|---|---|---|---|
| 4,257,705 | 3/1981 | Hosoe et al. | 356/1 |
| 4,375,332 | 3/1983 | Yokota et al. | 356/4 |
| 4,391,513 | 7/1983 | Fujiki | 356/1 |
| 4,469,939 | 9/1984 | Utagawa | 250/204 |
| 4,814,810 | 3/1989 | Ishiguro | 356/1 |

*Primary Examiner*—Edward P. Westin
*Attorney, Agent, or Firm*—Townsend and Townsend

[57] ABSTRACT

The light sensor has a light transmitter (10, 12) which radiates the light along an axis ($x_0$) of a transmitter system and two light receiving systems (12, 14) which pick up the light scattered back from an object (G) to be detected along a receiving system axis ($x_1$, $x_2$). A light sensitive element (16) has three detection zones ($E1_T$, $E_H$, $E2_T$) arranged in a row of which the outer zones ($E1_T$ and $E2_T$) each receive light via one of the receiving systems (12, 14) from a sensing zone (T) and of which the central detection zone ($E_H$) accepts light via both light receiving systems from the background region (H) of the field of view of the light sensor. An output signal which is used for object recognition is obtained by additive superposition of the signals of the detection zones ($E1_T$, $E2_T$) associated with the scanning region (T) and by difference formation with the signal from the detection zone ($E_H$) associated with the background region (H). The sensing distance (TW) is adjusted by adjusting a roof edge mirror (18) arranged in front of the light sensitive element (16).

11 Claims, 1 Drawing Sheet

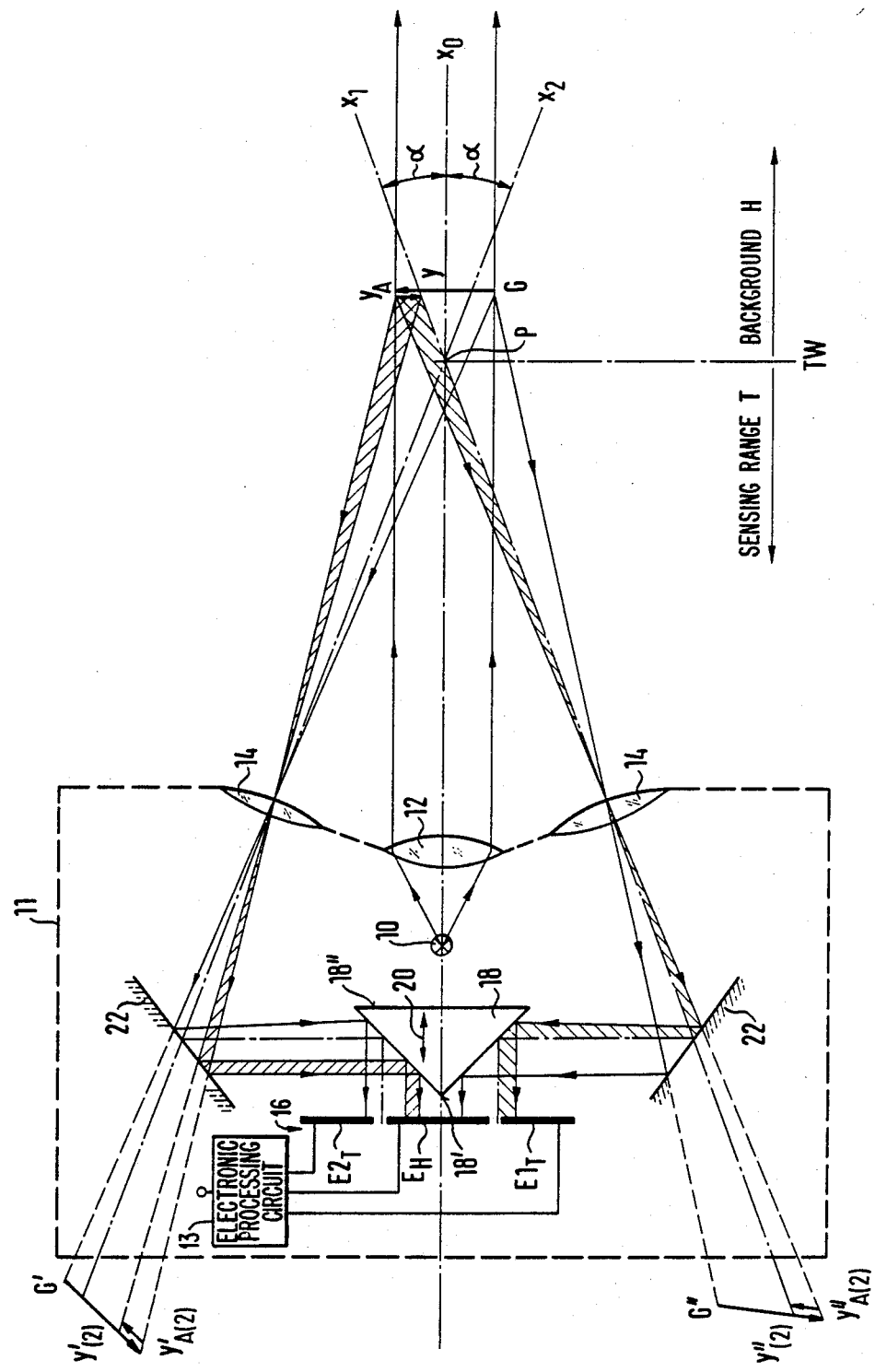

LIGHT SENSOR FOR DETECTING AN OBJECT IN A CERTAIN DISTANCE

The invention relates to a light sensor comprising a light transmitter having a light source and an optical transmitting system which radiates light along an axis of the transmitting system; and two light receiving systems arranged on opposite sides of the light transmitter alongside the latter; wherein each light receiving system has an objective lens which picks up light scattered back from an object to be detected along axes of the receiving system which lie symmetric to the axis of the transmitter system in one plane with the latter; wherein the receiving systems each contain one light sensitive element with two detection zones of which one picks up light essentially from a sensing region and the other picks up light essentially from a background region of the field of view of the light sensor; and wherein an output signal used to recognize the article is obtained by additive superposition of signals from the detection zones associated with the sensing region and of the signals from the detection zones associated with the background region and by difference formation of the two summed signals.

A light sensor of this kind is known in practice. Reference can be made to the brochure "National MQ-Dreistrahl-Schalter, Fotoelektrische Schalter der 2. Generation" der SDS-Relais AG, Deisenhofen, Germany. In this light sensor the detection zones are formed by light sensitive surfaces, which are separated from one another, of real photodetectors which are accommodated at a considerable spacing in the housing of the light sensor. This gives rise to a space consuming construction. The signal evaluation takes place by purely electronic signal addition, logarithmic amplification of the summed signals and subsequent difference formation. The difference signal which is obtained is compared for distance measurement with a predetermined reference level which can be changed to adjust the scanning distance. A disadvantage of this arrangement is the fact that electronic fluctuations in level can falsify the measurement result. Accordingly a comparatively expensive and complicated electronic checking system is required in order to ensure the desired measurement accuracy.

A device for optical distance measurement can be seen from US-PS No. 44 69 939 which is used for the focussing of a camera. Two light receiving systems form an image of the object in accordance with the triangulation principle on two position sensitive photodetectors and a balance of the two light receiving systems take place by the displacement of a roof edge mirror associated with the two light receiving systems in order to center and focus the image of the object onto the photodetectors. The distance to the object is obtained from the amount of displacement of the roof edge mirror.

The object underlying the invention is to provide a light sensor of the initially named kind with which it is possible to precisely set and to vary the scanning distance within a large adjustment range using an optically and electronically uncomplicated and compact construction, with it being possible to obtain good object discrimination, in particular of objects with inhomogenous reflection characteristics and/or objects which only fall partly into the transmitted light beam, and with it also being possible to ensure good blending out of the background and distance selectivity with the number of adjustable components being reduced to a minimum.

In order to satisfy this object the present invention provides that a light sensitive element is provided with three photoelectric detection zones, with a central detection zone being associated with the background region; in that received light picked up by the two objective lenses is transferred to the central detection zone for additive signal superposition by means of two fixedly arranged deflecting mirrors and a roof edge mirror located between them; in that the roof edge mirror is adjustable along the axis of the transmitting system for the purpose of adjusting the angle between the axes of the receiving systems which are determined by central rays which pass through the centres of the respective objective lenses and along the respective separating lines between the three detection zones or their virtual images generated by the roof edge mirror and the deflecting mirrors.

At the common detection zone provided in accordance with the invention an additive superposition of the beam flux picked up by the two light receiving systems takes place by an optical path. In this way one saves a photodetector and an electronic signal addition and achieves a correspondingly simple construction. A further advantage lies in the fact that all the photodetectors are spatially arranged closely alongside one another. They can thereby be realized on a single carrier substrate which brings advantages from a technical manufacturing viewpoint. The connection of the photodetectors to the electronic evaluation circuit likewise proves to be particularly simple. With suitable beam guidance a compact construction of the light sensor of the invention is also possible.

In a preferred embodiment the detection zones are realized by three photodetectors in a row with the central photodetector representing the common photodetector of the two light receiving systems. The central photodetector is associated with the background region of the light sensor. The output signal is obtained by difference formation between a sum of signals of the outer photodetectors and a signal of the central photodetector.

The optical reflecting system of the light sensor of the invention contains a roof edge mirror which is disposed in front of the photodetector arrangement with the half sides of the roof edge mirror each belonging to one of the light receiving systems. The roof edge mirror can have an apex angle of 90°. It can be adjusted parallel to the axis of the transmitting system in the direction towards or away from the photodetectors. In this way the possibility of a simple change of angle is provided between the system axes in order to adjust the desired scanning distance. The optoelectronic components of the light transmitter and of the light receiving systems remain fixed, which offers substantial advantages having regard to installation adjustment and interference suppression of the light sensor.

An objective fixed relative to the housing belongs to each of the light receiving systems, (and a deflecting mirror which is also fixed in the housing and preferably plane) reflects the light towards the adjustable roof edge mirror. The axes of the receiving systems are determined by a central ray which passes through the apex of the objective and the central point of one of the separating lines between the three photodetectors. On adjustment of the roof edge mirror the point of impingement of the central ray on the fixed deflecting mirrors is displaced, and, with a fixed objective, the angle between the system axes also changes.

In a further embodiment a position selective photodetector, in particular a photodiode array, is provided as a light sensitive element of the light sensor. The light sensor is thus developed from an apparatus with a defined scanning distance into a distance sensor, i.e. to a distance measuring apparatus.

The invention will now be explained in more detail in the following with reference to the drawing, the single FIGURE of which schematically shows the beam path of a light sensor in accordance with the invention.

BRIEF DESCRIPTION OF THE DRAWING

FIG. 1 is a schematic representation of the preferred embodiment of this invention.

DETAILED DESCRIPTION OF THE PREFERRED EMBODIMENT

The light sensor has a light source 10 and an optical transmitting system 12 which allows a parallel light beam to emerge from a light exit opening in the front side of a light sensor housing 11 which is indicated by broken lines. The system axis of the light transmitter 10, 12 is designated by $x_0$. It intersects at a common point P the two system axes $x_1$ and $x_2$ of two receiving systems. To each receiving system there belongs, on the one side of the optical transmitting system 12 and on the other side of the optical transmitting system 12 a respective receiving objective 14 arranged in the front side of the light sensor housing 11 and a respective plane deflecting mirror 22 mounted behind it in the interior of the light sensor housing 11. A roof edge mirror 18 and a light sensitive element 16 is moreover associated with the two receiving systems. The receiving system axes $x_1$, $x_2$ lie in a system plane together with the axis $x_0$ of the transmitting system which represents the principal axis of the light sensor. This system plane is identical with the plane of the drawing. Moreover, the system axes of the receiving systems subtend the same but opposite angles $\alpha$ with the axis of the transmitting system. The point of intersection of the system axes $x_0$, $x_1$ and $x_2$ marks the scanning range TW of the light sensor, i.e. the boundary between the scanning range T and a background range H. Objects which enter into the transmitted light beam within the scanning region should lead to a response of the light sensor, whereas objects located in the background range H should not be detected.

The light sensitive element 16 lies in a centrally symmetrical position with respect to the transmitter system axis $x_0$ behind the light transmitter 10, 11. It is planar and arranged substantially in a plane extending perpendicular to the axis $x_0$ of the transmitter system. Furthermore it is screened against direct light incidence from the light transmitter 10, 11. The light sensitive element 16 has three electrically separated detection zones which lie in a row. A central detection zone $E_H$ is penetrated by the axis $x_0$ of the transmitter system and extends from the axis $x_0$ of the system by the same amount in opposite directions within the system plane. Two detection zones $E1_T$, $E2_T$ are provided adjacent the central detection zone. The roof edge mirror 18 having the cross section of an isosceles, right-angled triangle is arranged between the light sensitive element 16 and the light source 10 on the axis $x_0$ of the transmitting system in such a way that the roof edge 18' lies on the axis $x_0$ of the transmitting system opposite to the light sensitive element 16 and the base surface 18" extends perpendicular to the axis $x_0$ of the transmitting system and faces away from the light sensitive element 16. The roof edge mirror 18 can be displaced parallel to the axis $x_0$ of the transmitting system in the direction of the arrow 20 relative to the light sensitive element 16, which is fixed relative to the housing in order to adjust the scanning range TW.

The deflecting mirrors are fixedly arranged in the housing on the two sides of the roof edge mirror 18 in the system plane and on the receiving system axes $x_1$ and $x_2$ respectively. They project the received light into a direction substantially perpendicular to the system axis $x_0$ towards the latter. All components also extend perpendicular to the plane of the drawing.

The receiving system axes $x_1$, $x_2$ are respectively determined by a central ray which falls through the centre of the corresponding objective 14 and, after deflection at the deflecting mirror 22 and the roof edge mirror 18, onto the separating line between the associated detection zones $E_H$, $E1_T$ and $E_H$, $E2_T$ respectively. On adjusting the roof edge mirror 18 in the direction of the double arrow 20 the point of incidence of this central ray on the deflecting mirror is displaced, whereby the angle $\alpha$ between the system axes $x_0$, $x_1$ and $x_0$, $x_2$ respectively is changed, and thus also the scanning range TW. Each deflecting mirror 22 must, in accordance with the invention, have a longitudinal extent corresponding to the range of adjustment of the roof edge mirror 18.

The arrangement and subdivision of the detection zones $E1_T$, $E_H$, $E2_T$ of the light sensitive element 16 is effected so that the outer detection zones $E1_T$, $E2_T$ largely pick up light via the respective receiving system from the scanning region T and so that the central detection zone $E_H$ receives light via the two receiving systems largely from the background region H of the field of view of the light sensor. One recognizes this first of all from the fact that a light beam coincident with one of the receiving system axes $x_1$, $x_2$ falls precisely on the separating lines between the central detection zone $E_H$ and the outer detection zones $E1_T$, $E2_T$. Furthermore, the drawing shows by way of example an article G which lies on the system axis $x_0$ in the background region H of the field of view of the light sensor, with the article being symbolized by the arrow y.

The arrow $y_A$ represents a surface zone of the article G which is more strongly reflecting than its remaining surface. Two superimposed images of the article G are projected through the two receiving systems and the roof edge mirror onto the light sensitive element 16 which is illustrated by hatched beam paths. The center point of these images lie symmetrically placed at the same distance relative to the axis $x_0$ of the transmitting system. Both images lie centre of gravity-wise on the common detection zone $E_H$ associated with the background region H. For an article lying within the sensing range T, the detection zones $E1_T$, $E2_T$ associated with the scanning range T would in contrast not be illuminated centre of gravity-wise (not illustrated).

The image G' of the object G projected by the objective 14 onto the light sensitive element 16 is reproduced visually following the upper deflecting mirror 22. In fully corresponding manner the image formed by the lower receiving system is also shown with the virtual image being designated by G".

One can see from the positions of the images G' and G" and in particular $y'_{(2)}$, $y'_{A(2)}$ and also $y''_{(2)}$, $y''_{A(2)}$ that the image position on the one side of the axis $x_0$ of the transmitting system at which the detection zone $E1_T$ is located is precisely the inverse to that on the other side of the axis $x_0$ of the transmitting system at which the detection zone $E2_T$ is located. Thus an increased beam flux is admittedly projected from the more strongly reflecting zone $y_A$ of the article G within the first light receiving system onto the detection zone $E1_T$ associated with the scanning region T. However, in reverse manner, the common detection zone $E_H$ which is associated with the background region H is illuminated with the increased received beam flux in the second light receiving system.

In order to obtain an output signal which can be used for article recognition the detection zones $E_H$, $E1_T$ and $E2_T$ are respectively connected to an electronic processing circuit 13 which forms a summed signal from the output signals of the detection zones $E1_T$, $E2_T$ associated with the scanning region and also the difference between these summed signals and the output signal of the common detection zone $E_H$ associated with the background region H, at which an additive superposition of received beam fluxes coming from the background region H takes place by an optical path. The arithmetic operations carried out in the electronic processing circuit 13 can be reproduced by the following formula:

$$SA = (S_{1T} + S_{2T}) - (S_H)$$

$S_{1T}$: the electrical output signal of the detection zone $E1_T$ $S_{2T}$: the electrical output signal of the detection zone $E2_T$ $S_H$: the electrical output signal of the detection zone $E_H$.

An electronic summation of the output signals associated with the background region H is not necessary since this has already taken place by the optical path. By corresponding layout of the light receiving optical system it is also possible to obtain the summed signal associated with the sensing region T or both summed signals by optical means (not shown).

Lack of homogeneity of the received beam flux which is brought about by inhomogenous reflection characteristics of the object detected is compensated for with the output signal that is received. In the illustrated embodiment a higher beam flux admittedly falls in the first receiving system from the more strongly reflecting section $y_A$ of the article on the detection zone $E1_T$ associated with the scanning region, which could on its own give the impression of an article located within the scanning range T. A correspondingly increased beam flux is however projected onto the common detection zone $E_H$ associated with the background region due to the reversed image position in the second beam system, so that the errors precisely cancel during difference formation in order to obtain the output signal.

Faults brought about by inhomogeneity of the illumination and only partial entry of an object into the transmitted light beam are compensated for in corresponding manner. The light sensor of the invention is thus characterized by very good object discrimination and blending out of the background. Its output signal has a sharply defined zero passage precisely at the selected scanning distance TW, and indeed independently of optical inhomogeneity of the scanned object and of the illumination.

The compensation principle described requires two receiving system axes $x_1$, $x_2$ symmetrical to the optical principal axis $x_0$ with the latter being defined by the separating lines between the detection zones $E1_T$, $E_H$, $E2_T$ of the light element 16 associated with the scanning region T on the background region H and by the apex point of the objective 14 of the light receiving systems. In the interest of a spatially compact construction the receiving system axes $x_1$, $x_2$ should lie as close together as possible.

In order to adjust the sensing distance TW the position of the roof edge mirror 18 is adjusted along the principal system axis $x_0$ which leads to a position change of the virtual images of the detection zone $E1_T$, $E_H$, $E2_T$. The position of the intermediate images which are projected changes by just the amount by which the roof edge mirror 18 is adjusted. The adjustment of the scanning distance TW by way of a roof edge mirror 18 has the advantage that only a passive optical element is moved while the optoelectronic components of the light transmitter 10, 12, and of the light receiving systems remain spatially fixed. A further advantage is the arrangement spatially close together of all the light sensitive elements and the presence of only three detection zones.

In a further alternative embodiment of the light sensor of the invention which is not illustrated a spatially resolving photodetector, in particular a photodiode array is used for the light sensitive element 16. This offers the possibility of developing the apparatus from a light sensor with a defined sensing distance to a distance sensor, i.e. to a distance measuring apparatus. The distance of the sensed object from the sensor is determined from the spacing of the back images of the transmitted light spot which are projected by the two light receiving systems.

An advantage of the system lies in the fact that the measurement is effected largely independently of the size of the light spot, of its homogeneity and of the reflective behavior of the object being sensed. In contrast to other methods in accordance with the triangulation principle, the measurement accuracy is thus not restricted by the size of the light spot or by the intensity distribution in the light spot but rather primarily by the raster spacing of the photodiode array. The reason for this is the fact that two congruent images are present for the evaluation and only the pixels of the photodiode array are, for example, used for the measurement and these have an intensity maximum within the respective image.

Further advantages arise from the greater independence of the measurement result on the size of the light spot at the photodiode array. The possibility exists of using a luminescent diode (LED, IRED) transmitting light or infrared radiation as the light source and thereby ensuring a measurement range and a resolution which could otherwise only be achieved with a laser light source. The depth of focus for the received beam path is found to have only a small influence on the measurement result so that a large scanning range can be achieved. In comparison to customary optical distance sensors operating in accordance with a triangulation method and having only one light transmitting and light receiving channel, only comparatively low requirements are placed on the image forming quality of the optical components for a comparable measurement range and comparable resolution.

We claim:

1. Light sensor comprising a light transmitter having a light source and an optical transmitting system which radiates light along an axis of the transmitting system; and two light receiving systems arranged on opposite sides of the light transmitter; wherein each light receiving system has an objective lens which picks up light scattered back from an object to be detected along an axis of the receiving system which lies symmetric to the axis of the transmitter system, the receiving system axes and the transmitter system axis lying in the same plane; wherein the receiving systems each contain two light sensitive element detection zones of which one picks up light essentially from a sensing region and the other picks up light essentially from a background region of the field of view of the light sensor; and wherein an output signal used to recognize the article is obtained by additive superposition of signals from the detection zones associated with the sensing region and of the signals from the detection zones associated with the background region and by difference formation of the two summed signals, characterized in that a light sensitive element is provided with three photoelectric detection zones ($E1_T$, $E_H$, $E2_T$) with a central detection zone ($E_H$) being associated with the background region (H); in that received light picked up by the two objective lenses (14) is transferred to the central detection zone for additive signal superposition by means of two fixedly arranged deflecting mirrors (22) and a roof edge mirror (18) located between them; in that the roof edge mirror (18) is adjustable along the axis ($x_O$) of the transmitting system for the purpose of adjusting the angle between the axes of the receiving system ($x_1$, $x_2$) which are determined by central rays which pass through the centers of the respected objective lenses (14) and along respective imaginary lines disposed between and separating the three detection zones ($E1_T$, $E_H$, $E2_T$).

2. Light sensor in accordance with claim 1, characterized in that the roof edge (18') of the roof edge mirror (18) lies on the axis ($x_0$) of the transmitting system and is disposed towards the central detection zone ($E_H$).

3. Light sensor in accordance with claim 1, characterized in that the roof edge angle is bisected by the axis ($x_0$) of the transmitting system.

4. Light sensor in accordance with claim 1, characterized in that the roof edge mirror (18) has an apex angle of 90°.

5. Light sensor in accordance with claim 1, characterized in that the three photoelectric detection zones ($E1_T$, $E_H$, $E2_T$) are arranged in a row, with the central detection ($E_H$) being associated with both light receiving systems.

6. Light sensor in accordance with claim 1, characterized in that an electronic evaluation circuit (13) forms an output signal by formation of the difference of the sum of the signals from the outer detection zones ($E1_T + E2_T$) less the signal of the central detection zone ($E_H$).

7. Light sensor in accordance with claim 1, characterized that the angle $\alpha$ between the axis ($x_0$) of the transmitting system and the axis of one receiving system ($x_1$) amounts to between 2° and 45° for the central position of the roof edge mirror (18), the angle between the other receiving system ($x_2$) and the axis ($x_0$) of the transmitting system between substantially equal thereto.

8. Light sensor in accordance with claim 1, characterized in that the angle $\alpha$ between the axis ($x_0$) of the transmitting system and the axis of one receiving system can be varied between 1° and 15° by displacement of the roof edge mirror (18).

9. Light sensor in accordance with claim 1, characterized in that a position selective photodetector, in particular a photodiode array is provided as the light sensitive element; and in that the spacing of the images of the transmitted light beam projected back onto the light sensitive element from the two light receiving systems is determined to establish the distance of the object from the light sensor.

10. Light sensor in accordance with claim 1, characterized that the angle $\alpha$ between the axis ($x_0$) of the transmitting system and the axis of one receiving system ($x_1$) amounts to between 2° and 10° for the central position of the roof edge mirror (18), the angle between the other receiving system ($x_2$) and the axis ($x_0$) of the transmitting system being substantially equal thereto.

11. Light sensor in accordance with claim 1, characterized in that the angle $\alpha$ between the axis ($x_0$) of the transmitting system and the axis of one receiving system can be varied between 1° and 5° by displacement of the roof edge mirror (18).

* * * * *